US006980290B2

(12) United States Patent
Ohta et al.

(10) Patent No.: US 6,980,290 B2
(45) Date of Patent: Dec. 27, 2005

(54) OPTICAL SAMPLING WAVEFORM MEASURING APPARATUS

(75) Inventors: Hiroshi Ohta, Yamato (JP); Makoto Yoshida, Nagoya (JP)

(73) Assignee: Yokogawa Electric Corporation, Tokyo (JP)

( * ) Notice: Subject to any disclaimer, the term of this patent is extended or adjusted under 35 U.S.C. 154(b) by 432 days.

(21) Appl. No.: 10/228,607

(22) Filed: Aug. 27, 2002

(65) Prior Publication Data

US 2003/0043366 A1 Mar. 6, 2003

(30) Foreign Application Priority Data

Aug. 28, 2001 (JP) ............................. 2001-258008

(51) Int. Cl.⁷ .............................................. G01J 1/00
(52) U.S. Cl. .................................... 356/121; 356/124.4
(58) Field of Search ................................. 356/121–127

(56) References Cited

U.S. PATENT DOCUMENTS

| | | | |
|---|---|---|---|
| 4,997,277 A | * | 3/1991 | Horiguchi et al. ......... 356/73.1 |
| 5,546,414 A | * | 8/1996 | Pfeiffer ......................... 372/18 |
| 6,373,867 B1 | * | 4/2002 | Lin et al. ....................... 372/18 |
| 2003/0016347 A1 | * | 1/2003 | Ohta ........................... 356/124.5 |

FOREIGN PATENT DOCUMENTS

| JP | 6-63869 | 8/1994 |
|---|---|---|
| JP | 8-233662 | 9/1996 |

OTHER PUBLICATIONS

Kawaguchi et al., "Development of 310-GHz optical sampling system", (and English abstract) The Institute of Electronics, Information and Communication Engineers, Society Meeting, B-10-149, 2000.

Nogiwa, et al., "Development of highly sensitive optical-sampling system using a PPLN crystal", (and English abstract) The Institute of Electronics, Information and Communications Engineers, General Meeting, B-10-170, 2000.

Nishizawa et al., "Compact system of wavelength-tunable femtosecond soliton pulse generation using optical fibers" IEEE Photonics Technology Letters vol. 11, No. 3, 1999.

* cited by examiner

Primary Examiner—Hoa Q. Pham
(74) Attorney, Agent, or Firm—Cohen, Pontani, Lieberman & Pavane

(57) ABSTRACT

An optical sampling waveform measuring apparatus can measure waveform of a high-speed signal light P8 sensitively, accurately, and in high time resolution, Raman shift light which is generated from a light pulse having a narrower pulse width than the signal light to be measured is used as a sampling light pulse.

5 Claims, 7 Drawing Sheets

OPTICAL SAMPLING WAVEFORM MEASURING APPARATUS

BACKGROUND OF THE INVENTION

1. Field of the Invention

The present invention relates to an optical sampling waveform measuring apparatus which measures an optical wavelength in an ultrashort time period which cannot be measured by a method using a photoelectric conversion element. The present invention particularly relates to an optical sampling waveform measuring apparatus which can measure an optical waveform of an input signal light to be measured with high sensitivity and with high time resolution.

2. Description of Related Art

In an ordinary optical sampling waveform measuring apparatus, a sum frequency light (hereinafter called SF light) by which a formula such as $\omega3=\omega1+\omega2$ is effective by performing cross co-relation of a light pulse to be measured (angular frequency $\omega1$) in a nonlinear optical crystal and a sampling light pulse having a narrower pulse width than that of the light pulse (angular frequency $\omega2$) to be measured has been extracted (See Japanese Examined Patent Application, Second Publication No. 6-63869).

The above-mentioned optical sampling waveform measuring apparatus performs photoelectric conversion of the SF light which is obtained by the nonlinear optical effect by the light receptor in the nonlinear optical crystal and displays the waveform by processing signals electrically.

In the optical sampling waveform measuring apparatus, the time resolution in the measurement of optical waveform is limited by the pulse width of the sampling light pulse and group velocity delay between the sampling light pulse and signal light to be measured.

Also, nonlinear optical effect is used for measuring an optical waveform, it is necessary to perform phase matching for generating an SF light.

For a method of phase matching, an angle matching method can be mentioned in which the incident angle of sampling light pulse and signal light to be measured into a nonlinear optical crystal element is adjusted by using birefringence of the nonlinear optical crystal such that phase matching of sampling light pulse, signal light to be measured, and SF light to be generated are realized.

Here, a first kind of phase matching condition is defined as a phase matching condition under which a sampling light pulse and a signal light to be measured are incident in the same linear polarization direction. A second kind of phase matching condition is defined as a phase matching condition under which a sampling light pulse and a signal light to be measured are incident in an orthogonal linear polarization direction.

At present, for the nonlinear optical crystal which has been used for generating nonlinear optical effects most commonly, KTP ($KTiOPO_4$) using the second kind of phase matching condition can be named (See reference document 1: Development of 310 GHz optical sampling system, by Kawaguchi, Nogiwa, Ota, and Endo, The Institute of Electronics, Information and Communication Engineers, Society Meeting, B-10-149, 2000).

However, the nonlinear optical effect of KTP crystal under the above-mentioned second kind of phase matching condition is not sufficient, and it is not possible to improve the measuring accuracy of a waveform of the signal light to be measured.

On the other hand, in the first kind of phase matching condition in which a sampling light pulse and a signal light to be measured are in the same polarization state, if a nonlinear optical crystal which can realize a nonlinear optical effect is used, it is possible to improve waveform measurement accuracy by using a large nonlinear optical constant in a nonlinear optical crystal.

However, KTP crystal and a $LiNbO_3$ having a large nonlinear optical constant do not have the first kind of phase matching condition; therefore, it is not possible to use the large nonlinear optical constant.

Recently, an idea of pseudo-phase matching is proposed by which a phase matching condition is realized artificially by inverting polarization of the nonlinear optical crystal periodically such that the first kind of phase matching condition is satisfied.

According to the pseudo-phase matching, the polarization of the nonlinear optical crystal is inverted by charging a high electric field at a high temperature under conditions in which the nonlinear optical crystal which is used in the nonlinear optical element is an $LiNbO_3$, both wavelength of the sampling light pulse and wavelength of the signal light to be measured are in nearly 1550 nm and the frequency of polarization of the above-mentioned nonlinear optical crystal is nearly in 18 $\mu$m; thus, the periodically domain-inverted $LiNbO_3$ crystal (PPLN: Periodically-polled Lithium Niobate) can be generated. The first kind of phase matching condition can be realized artificially when the sampling light pulse and the signal light to be measured are incident in the PPLN; therefore, a large nonlinear optical effect can be obtained.

The optical sampling waveform measuring apparatus using such a theory has been reported (See reference document 2, "Development of high sensitive optical sampling system using PPLN crystal" by Nogiwa, Kawaguchi, Ota, Endo, The Institute of Electronics, Information and Communication Engineers, General Meeting, B-10-170, 2000).

The photoelectric inversion of the SF light which is obtained by using the above-mentioned first kind of phase matching condition is performed by a receptor such as a photoelectric inversion element, a waveform of the sampling result is displayed by processing an electric signal, and characteristics of the signal light to be measured are evaluated. A structure of a conventional optical sampling waveform measuring apparatus is shown in FIG. 7.

In FIG. 7, an electric signal generator SG1 generates, for example a periodical electric signal and outputs an electric signal P1 having frequency $f_{sig}$ as a cycle period.

An electric signal generator SG2 generates, for example a periodical electric signal and generates an electric signal P2 having frequency $((f_{sig}/n)-\Delta f)$ as a cycle period which synchronizes the electric signal P1.

An amplifier 100 amplifies the input sampling pulse signal P2 and gains a narrow width electric pulse by an narrow pulse generator 101.

A laser oscillator 102 generates a narrow width light pulse by a gain switching method by using the electric pulse. An optical circulator 103 inputs a continuous light (CW light) which is generated by a laser oscillator 104 to the laser oscillator 102 in order to reduce timing jitter of the sampling light pulse and outputs the light pulse P3 which is generated by the laser oscillator 102.

A DCF (Dispersion Compensation Fiber) 105 performs a linear compression of the above-mentioned light pulse P3. An EDFA (erbium-doped fiber amplifier) 106 amplifies the linearly-compressed light pulse P3. A DSF (Dispersion shift fiber) 107 extends the input light pulse P3 to a rectangular shape.

Next, an optical amplifier 108 amplifies the light pulse P3 which is transformed into a rectangular shape and performs pulse compression of the light pulse P3. A polarization direction controller 109 controls a polarization direction of the light pulse P3 and outputs a sampling light pulse P4.

An MLFRL (mode-locked fiber ring laser) 110 generates a light pulse P6 which synchronizes the frequency of the signal light P1 to be measured.

A light intensity modulator 112 modulates the light pulse P6 by using a predetermined pattern (data row made from "0 (zero)" and "1 (one)") which is output by a pattern generator 111 synchronizing the signal light P1 to be measured and outputs the modulated light pulse P7.

A light amplifier 113 amplifies the light pulse P7. A polarization controller 114 controls the polarization direction of the input light pulse P7 and outputs light pulse P8.

A wavelength division multiplexer 115 mixes the light pulse P8 and the sampling light pulse P4 and outputs the multiplexed light pulse P9.

A PPLN 116 is a nonlinear optical crystal element. A PPLN 116 is also a periodically domain-inverted nonlinear optical crystal as explained above and satisfies the first kind of phase matching condition artificially.

When the phase matching of the sampling light pulse P4 and the light pulse P8 is completed under the first kind of phase matching condition, the PPLN 116 ejects the SF light of the light pulse P9 which is a cross co-relation signal of two light pulses as a result of the large nonlinear optical effect.

Here, the polarization directions of both incident lights are the same; therefore, the phase matching occurs when both lights are extraordinary lights or when both lights are ordinary lights due to the birefringence of the nonlinear optical crystal.

A light band pass filter 117 removes a noise component from of the SF light and outputs the above-mentioned SF light which is a light pulse having only angular frequency ($\omega 1+\omega 2$).

A receptor 118 is a photoelectric inversion element such as an avalanche photodiode and performs photoelectric inversion of the input SF light and outputs measured signal PS.

An A/D inverter 119 inverts a peak voltage of the input measured signal PS into a digital value by a predetermined timing and outputs it.

A computer 120 performs the processing of the above-mentioned digital value, generates an optical eye pattern, displays an image of the optical eye pattern, and evaluates characteristics of the waveform of the signal light (light pulse P7) to be measured which is used for communication.

As mentioned above, when the pseudo-phase matching condition using PPLN is used as shown in FIG. 7, an optical sampling waveform measuring apparatus can achieve highly sensitive sampling waveform measuring because of the large nonlinear optical effect.

As explained above, the time resolution depends on the sampling pulse width and the group velocity delay.

According to the first kind of phase matching condition, it is possible to restrain the group velocity delay at one hundredth of the second kind of phase matching condition. For example, the group velocity delay of the 1 cm length of the crystal is several 10s of fs; thus, it is possible to obtain high time resolution.

The above-mentioned pseudo-phase matching has a problem such as an occurrence of a second harmonic beam.

Ordinarily, a sampling light pulse and a signal light to be measured are generated so as to have a wavelength of nearly 1550 nm. The pseudo-phase matching condition is a first kind of phase matching condition; therefore, the second harmonic beam of the sampling light pulse and the signal light to be measured is generated in addition to the SF light Here, a light pulse having a narrower width than the signal light to be measured is used for the sampling light pulse in order to perform sampling of the signal light to be measured.

The power of the sampling light is so high that the output of the second harmonic beam of the sampling light pulse is greater than the output of the SF light which is generated by the sampling operation.

Also, the wavelength of the second harmonic beam of the SF light and the sampling light pulse become closer to 775 nm. Therefore, it is necessary to select only an SF light by using a light band pass filter (BPF) 117 so as to cut the second harmonic beam.

Here, in a optical sampling waveform measuring apparatus shown in FIG. 7, the wavelength of the SF light and the wavelength of the second harmonic beam are very close; therefore, there is a problem in that the second harmonic beam cannot be removed, or that a transmission loss of the SF light becomes large.

Furthermore, wavelength of the generated SF light changes according to wavelength of the signal light P8 to be measured; therefore, it was necessary to adjust the selected wavelength of the BPF 117 each time the wavelength of the SF light changed. Spectrum of the SF light and spectrum of second harmonic beam overlapped when the second harmonic beam was in a certain value, it was anticipated that a component of the second harmonic beam which passes the BPF 117 increases; thus, it is not possible to remove the second harmonic beam completely.

As a result, in the conventional optical sampling waveform measuring apparatus shown in FIG. 7, there are problems such as inferior sensitivity due to the existence of the second harmonic beam, inferior signal-noise ratio, and the signal light having non-measurable wavelength.

As explained above, the conventional optical sampling waveform measuring apparatus can utilize large nonlinear optical constant so as to measure very sensitively when a first kind of phase matching condition including pseudo-phase matching as a nonlinear optical effect is used.

On the other hand, in the conventional optical sampling waveform measuring apparatus, there are problems such as inferior sensitivity due to the existence of the second harmonic beam, inferior signal-noise ratio, and the signal light having non-measurable wavelength.

Here, the object of the present invention which is established in consideration of the above-mentioned problems is to provide an optical sampling waveform measuring apparatus which can measure waveforms of ultra-high speed signal light to be measured very sensitively, in high time resolution, and very accurately, by using Raman shift light having narrow pulse width according to the signal light to be measured as a sampling light.

SUMMARY OF THE INVENTION

The optical sampling waveform measuring apparatus according to a first aspect of the present invention is characterized in measuring an optical waveform by sampling a signal light to be measured (signal light P8 to be measured) by using a nonlinear optical effect of the light pulse having a narrower pulse width than the signal light to be measured, and it is characterized in that a Raman shift light (Raman shift light P13) which is generated from a light pulse having a narrower pulse width than the signal light to be measured is used as a sampling light pulse (sampling pulse light P4). Raman shift light (Raman shift light P13) is generated from a light pulse (input light pulse P5) having a narrower width than the signal light to be measured in an optical fiber (optical fiber 201 for Raman shift). By adjusting the wavelength of the Raman shift light, in a nonlinear optical crystal element (nonlinear optical crystal element 116), the wavelength of the SF light which is generated from the signal light to be measured and the sampling light pulse is made different from the bandwidth of the second harmonic beam which is concurrently generated; thus, it is possible to measure various wavelengths of the signal light to be measured without adjusting the passing wavelength bandwidth of the band pass filter BPF 117.

A second aspect of the present invention is characterized in that a sum frequency light generation effect is utilized in which a first kind of phase matching condition is used as a nonlinear optical effect.

A third aspect of the present invention is characterized in that a Raman shift light is used, and a difference frequency light generation effect is utilized in which a first kind of phase matching condition is used as a nonlinear optical effect.

A fourth aspect of the present invention is characterized in that a Raman shift light is used, and a nonlinear optical crystal having a periodically domain-inverted structure is used as a nonlinear optical element (nonlinear optical crystal element 116) for realizing the nonlinear optical effect.

A fifth aspect of the present invention is characterized in that a variable optical attenuator (variable optical attenuator 203 for controlling input power) is provided for adjusting a wavelength of the generated Raman shift light.

A sixth aspect of the present invention is characterized in that a monitoring function for Raman shift light wavelength (monitoring device 204 for light wavelength) so as to perform control by monitoring the wavelength of the Raman shift light is provided.

As explained above, the optical sampling waveform measuring apparatus according to the present invention uses the sampling light pulse, which has a wavelength range in which the wavelength of the SF light and the wavelength of the second harmonic beam are distant in the nonlinear optical crystal element (nonlinear optical crystal element 116) which is made of PPLN crystal, generated from the Raman shift light. Therefore, it is possible to extract the SF light component by the band pass filter (BPF 117) easily. Also, the SF light is always generated in a certain wavelength range, it is not necessary that the band pass filter be adjusted every time the wavelength of the signal light to be measured changes. Accordingly, it is not necessary to adjust the wavelength range of the passing frequency through the band pass filter. Therefore, it is possible to measure the optical waveform of the high-speed signal light to be measured easily and very stably.

DETAILED DESCRIPTION OF THE INVENTION

Figure 1:
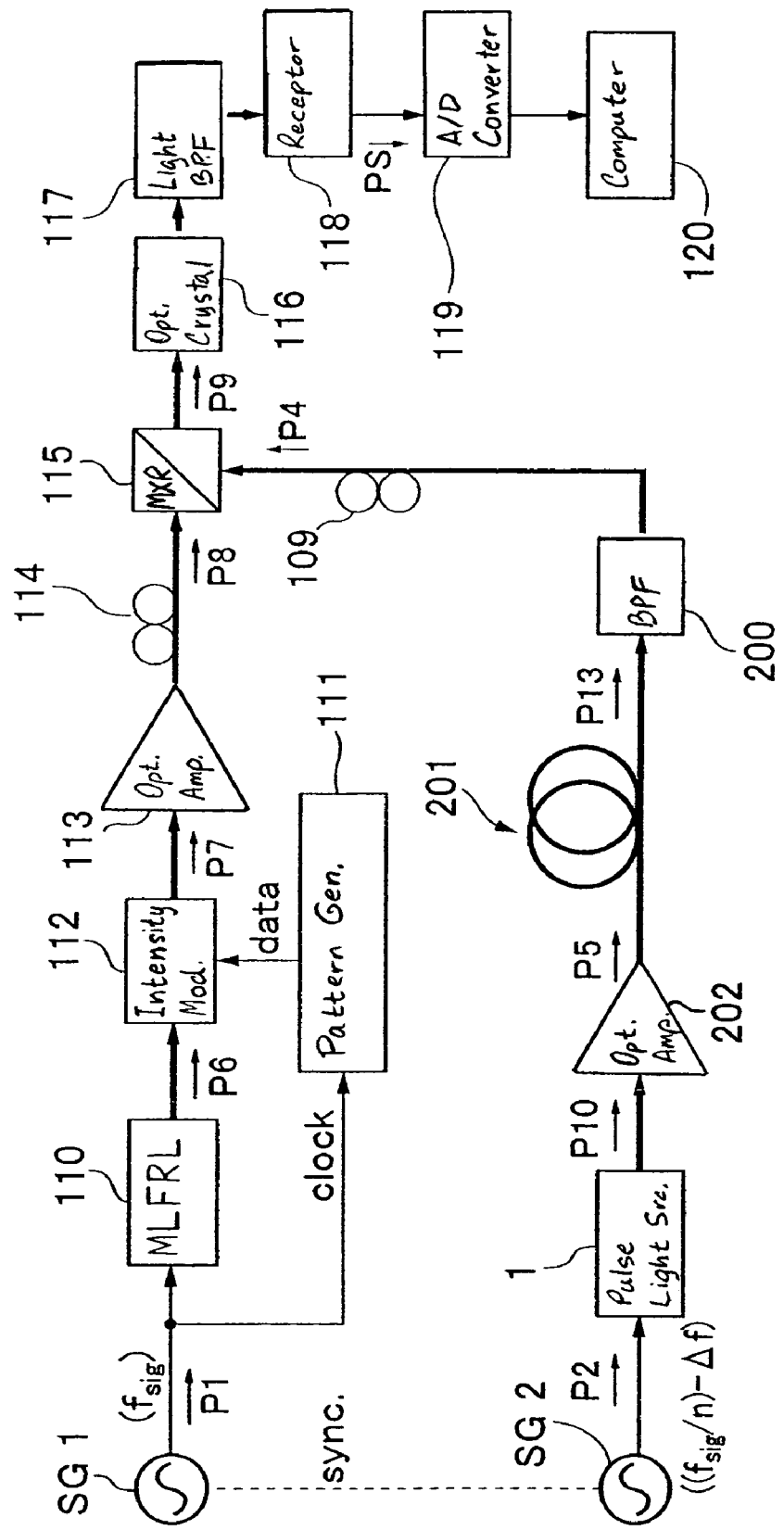
FIG. 1 is a block diagram of the first embodiment of the optical sampling waveform measuring apparatus according to the present invention.
Figure 2:
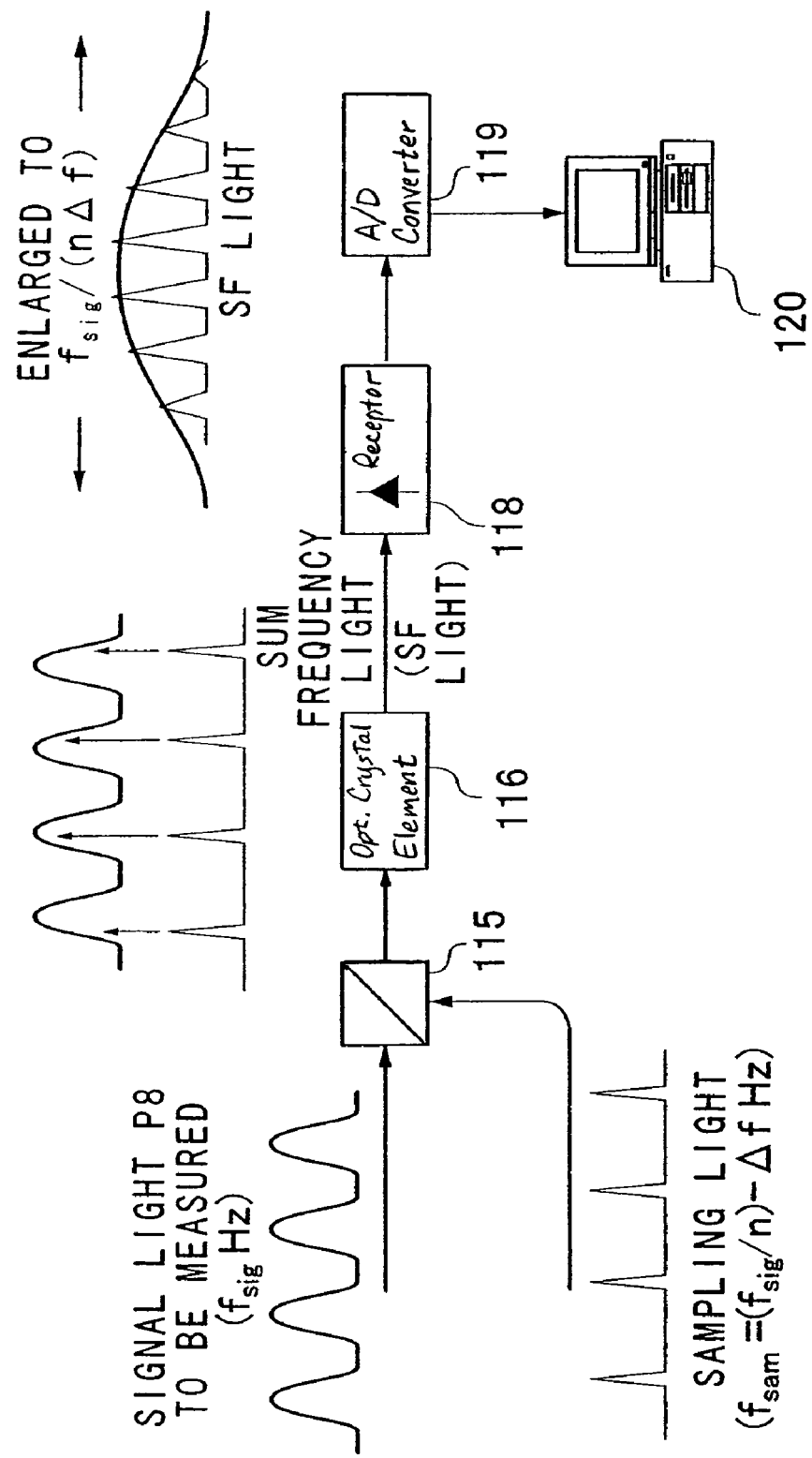
FIG. 2 is a view for showing measurement theory of the optical sampling of the optical waveform.

Embodiments according to the present invention are explained as follows with reference to the drawings. FIG. 1 is a block diagram showing an example of a structure of the optical sampling waveform measuring apparatus according to the first embodiment of the present invention. FIG. 2 is a schematic view for explaining a measurement theory of the optical sampling waveform measuring apparatus according to the present invention.

Figure 7:
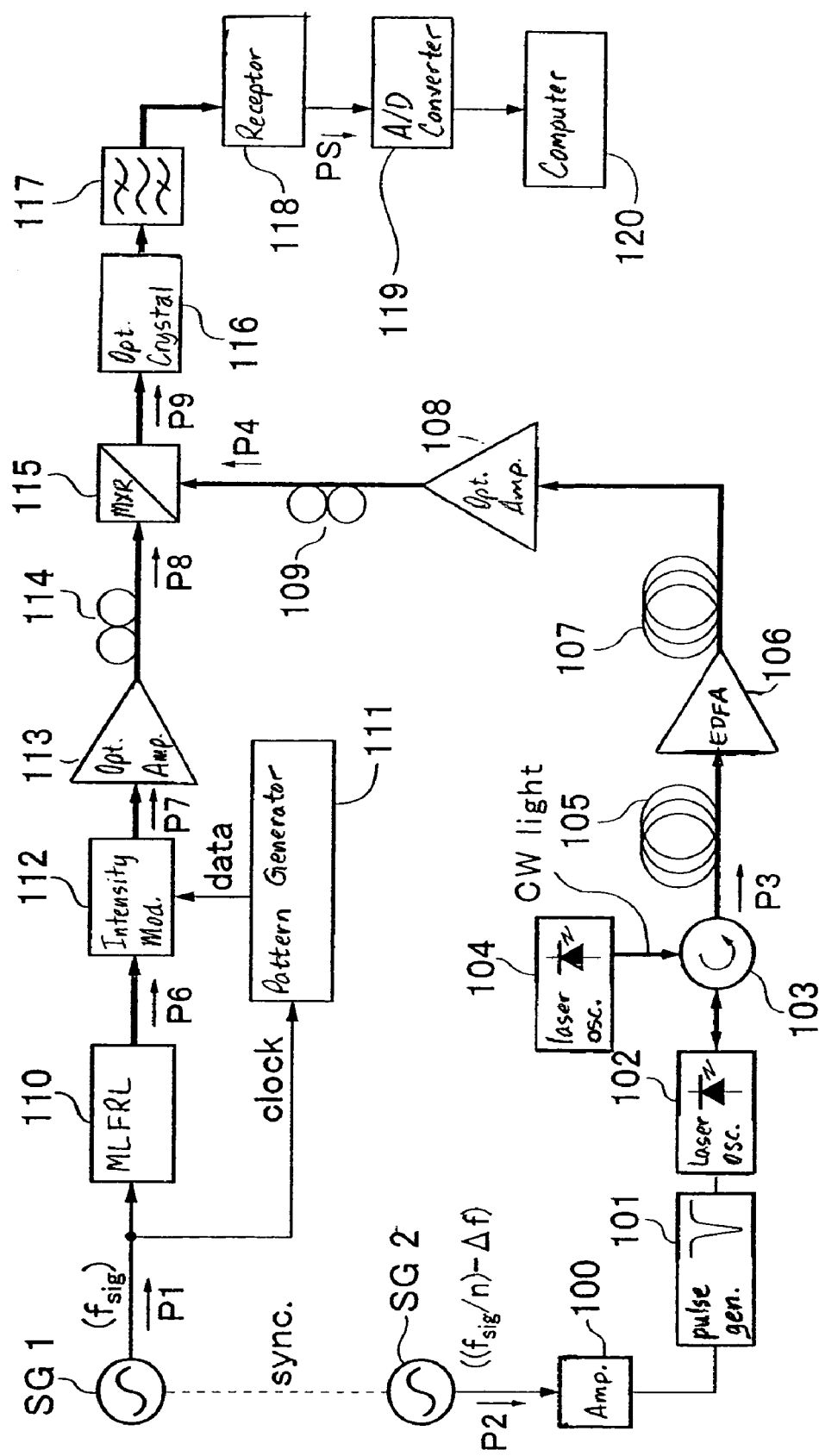
FIG. 7 is a block diagram of the conventional optical sampling waveform measuring apparatus.

In FIG. 1, the same reference numerals are applied to the same structures as those described in the conventional art shown in FIG. 7. In particular, a structure for generating the signal light (light pulse P8) to be measured according to the present invention is the same as in the conventional structure.

First, measurement theory of the optical sampling waveform measuring apparatus used in the present invention is explained with reference to FIG. 2.

In FIG. 2, a signal light (light pulse P8) to be measured having a cycle period such as "$f_{sig}$" and a sampling light pulse P4 having a cycle period such as "$(f_{sig}/n)-\Delta f$" which is lower than a value $1/n$ (n is an integral number) of the cycle period "$f_{sig}$" by several 100s of Hz to several KHz are multiplied by a wavelength division multiplexer 115 so as to be incident on an element 116 such as a nonlinear optical crystal (for example, PPLN).

SF light can be generated by phase-matching only when both the signal light P8 to be measured (angular frequency ω1) and the sampling light pulse P4 (angular frequency ω2) are incident in the nonlinear optical crystal element 116 by nonlinear optical effects such as SF light generation.

Explanation is made with reference to the SF light as follows. In the present invention, a nonlinear optical crystal element made of a nonlinear optical crystal which generates difference frequency light may be used in place of the above-mentioned nonlinear optical crystal element 116, and photoelectric inversion of the difference frequency light may be performed so as to output a measured signal PS.

By such a structure, pulse width of the sampling light pulse P4 is sufficiently narrower than pulse width of the signal light P8 to be measured, the sampling operation of the above-mentioned signal light P8 to be measured can be performed by a sampling theory at periodic time intervals; thus, it is possible to measure the light waveform of the signal light P8 to be measured by receiving the SF light so as to display the wavelength.

That is, the receptor 118 receives the SF light and performs photoelectric inversion so as to output measured signal PS in the same way as shown in the conventional case in FIG. 7.

An A/D inverter 119 inverts the measured signal PS to digital value; thus by displaying the waveform in a computer 12, the waveform of the signal light P8 to be measured can be measured in the form of an optical eye pattern (measurement of the waveform is performed by enlarging the waveform of cycle period of "$f_{sig}$" to the waveform of the cycle period of "$(f_{sig}/n)-\Delta f)$").

Figure 3:
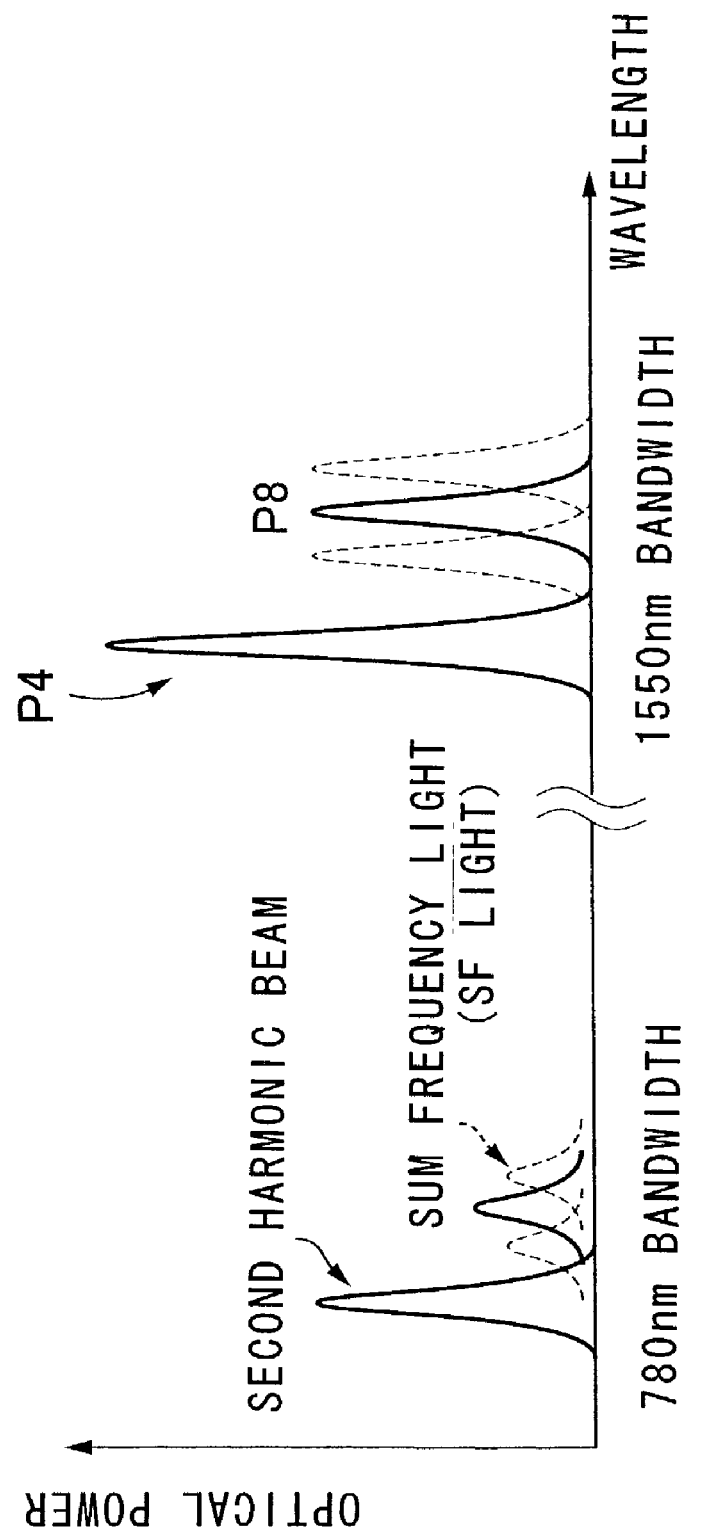
FIGS. 3 and 4 are views for showing the relationship between the wavelength of the SF light which is generated in the nonlinear optical crystal element 116 and the wavelength of the second harmonic beam according to the sampling light pulse P4 and the signal light P8 to be measured.

However, in order to perform such a light sampling, a PPLN crystal as a nonlinear optical crystal is used as a nonlinear optical element 116, as shown in FIG. 3, efficiency for inverting to the SF light becomes large, and the second harmonic beam having high optical intensity is generated.

In FIG. 3, the horizontal axis represents wavelength, and the vertical axis represents optical intensity (optical power). In FIG. 3, the wavelength and the optical intensity of the sampling light pulse P4, signal light P8 to be measured, SF light, and second harmonic beam are indicated.

Therefore, in order to avoid adverse effects of the second harmonic beam having a nearby wavelength while measuring the SF light, it is necessary to set the wavelength of the sampling light pulse P4 in a distant bandwidth of wavelength from that of the signal light P8 to be measured.

For example, in the reference document 2, the wavelength of the sampling light pulse P4 is set at 1534 nm. On the other hand, the wavelength of the signal light P8 to be measured is set at 1560 nm.

The SF light occurs at a wavelength of 773.44 nm which is a sum of the angular frequency of the wavelength of the sampling light pulse P4 and the angular frequency of the wavelength of the signal light P8 to be measured.

Here, because the width of the light pulse of the sampling light pulse P4 is narrow, and the optical intensity of the light pulse of the sampling light pulse P4 is large, the second harmonic beam which is greater than the SF light to be measured occurs at a wavelength of 780 nm.

In such a case, in order to obtain a result of measurement of the waveform of the sampling light of the signal light P8 to be measured, it is necessary to cut the second harmonic beam by the BPF 117 (optical band pass filter) so as to extract only the second harmonic beam.

However, as already mentioned above, the bandwidth of the wavelength of the second harmonic beam and the bandwidth of the SF light are close, and the optical intensity of the second harmonic beam is greater than the optical intensity of the SF light. Therefore, it is very difficult to cut a component of the second harmonic beam by the above-mentioned optical band pass filter completely.

Furthermore, when the wavelength of the signal light P8 becomes closer to the wavelength of the sampling light pulse P4, the wavelength of the generated SF light becomes closer to the wavelength of the second harmonic beam. Therefore, it is more difficult to separate the SF light from the second harmonic beam.

Also, SF light and the second harmonic beam are light pulses; thus, SF light and the second harmonic beam have predetermined bandwidth in the optical spectrum in wavelength axis. Therefore, if the SF light and the second harmonic beam become too close to each other, the spectrums of both lights are duplicated.

As a result, if the bandwidth of the wavelength which is cut by the optical band pass filter is the wavelength of the component of the second harmonic beam, the component of the SF light is removed therewith. Therefore, it is impossible to remove only the components of the second harmonic beam.

In order to solve the above-mentioned problem, a sampling light pulse P4 having a wavelength which greatly differs from the wavelength of the signal light P4 to be measured can be used.

For example, if a Titanium Sapphire laser is used, a light pulse of 100 fs of a wavelength of 780 nm can be easily obtained.

However, if a Titanium Sapphire laser is used, the optical sampling waveform measuring apparatus becomes large. Therefore, it is preferable that the sampling light pulse P4 have a wavelength of 1550 nm, which is the same as the wavelength of the signal light P8 to be measured, because it is necessary to synchronize the signal light P8 to be measured with the sampling light pulse P4 and the manufacturing cost of the optical sampling waveform measuring apparatus must be reduced.

Accordingly, in the present invention, Raman shift light as a sampling light pulse P4 for measuring the signal light P8 to be measured is used.

Here, the Raman shift light is an ultra-short light pulse which is transmitted in a fiber when an ultra-short light pulse is incident on an optical fiber and is generated by a shift of wavelength to a longer wavelength or to a shorter wavelength, aside from the incident light pulse by a Raman effect as a kind of nonlinear optical effect.

The pulse waveform of the generated Raman shift light becomes a typical sech2 waveform (See reference document 3: Nishizawa and T. Goto, "Compact system of wavelength-tunable femtosecond soliton pulse generation using optical fibers", IEEE Photon. Technol. Lett., pp. 325–327, vol. 11, 1999).

Here, "sech" indicates a second hyperbolic function.

The Raman shift light is characterized in that a light pulse having a typical sech2 waveform can be obtained, and the wavelength of the generated Raman shift light P8 can be changed by changing the incident intensity (optical intensity).

Figure 4:
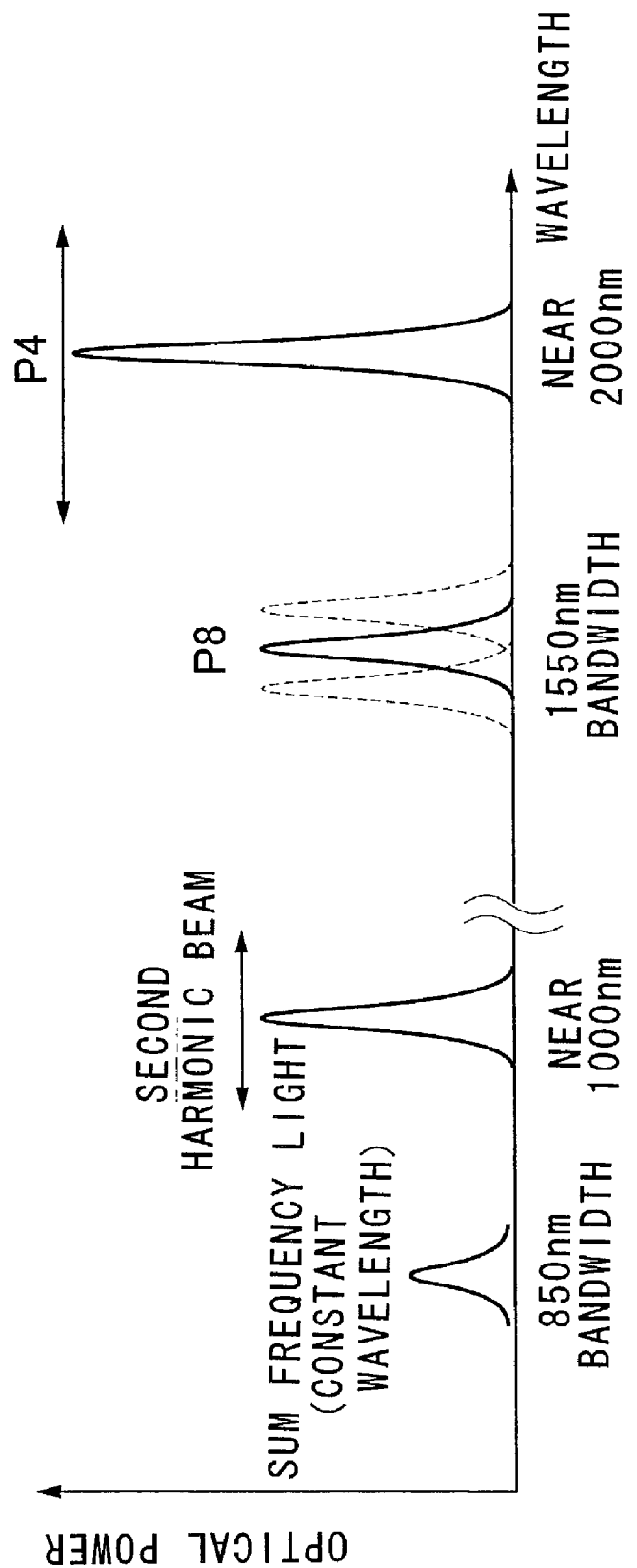

In the present invention, an advantage of the Raman shift light which is used as a sampling light pulse P4 is explained with reference to FIG. 4. In FIG. 4, the horizontal axis represents wavelength, and the vertical axis represents optical intensity (optical power). In FIG. 4, the wavelength and the optical intensity of the sampling light pulse P4, signal light P8 to be measured, SF light, and second harmonic beam are indicated.

Here, the Raman shift light occurs based on the incident light pulse having a wavelength of 1550 nm which is the same as the wavelength of the signal light P8 to be measured.

For a generating device for generating the above-mentioned input light pulse having a wavelength of 1550 nm, various methods such as a gain switching method using a semiconductor laser, and a method using a fiber laser, are proposed by which such input light pulse can be generated easily at low cost.

Also, by the above-mentioned methods, it is relatively easy to synchronize the above-mentioned generated input light pulse to the signal light P8 to be measured.

When the input light pulse (input light pulse P5) is input to an optical fiber so as to generate the above-mentioned Raman shift light, the generated Raman shift light can obtain the waveform of an optimal sech2 light pulse, and the value of the wavelength of the Raman shift light can be 1550 to 2000 nm, be shifted to a wavelength shorter than 1550 nm, or be shifted to a wavelength longer than 1550 nm even if the waveform of the input light pulse is disturbed by the Kerr effect as disclosed in the reference document 3.

For example, when the Raman shift light having a wavelength of 2000 nm is used as a sampling light pulse P4 so as to perform light sampling of the signal light P8 to be measured, the wavelength of the SF light becomes 873.2 nm which differs greatly from the 1000 nm wavelength of the second harmonic beam according to the signal light to be measured having a wavelength of 1550 nm. Therefore, it is quite easy to extract only SF light by using the optical band pass filter.

Furthermore, for example, if the wavelength of the signal light P8 to be measured changes to 1600 nm, it is possible to adjust the wavelength of the SF light to 873.2 nm and the wavelength of the second harmonic beam to 961 nm by changing the wavelength of the above-mentioned Raman shift light to 1922 nm by adjusting the optical intensity of the input light pulse.

By doing this, because the wavelength of the second harmonic beam is greatly different form the wavelength of the SF light, it is easy to cut the second harmonic beam by using the optical band pass filter.

Also, if the wavelength of the signal light P8 to be measured changes, as explained above, it is possible to maintain the wavelength of the SF light by adjusting the intensity of the incident light pulse so as to change the wavelength of the Raman shift light.

As an advantage of the result, it is not necessary to change the wavelength bandwidth which is passed by the BPF (optical band pass filter); thus, it is possible to set the bandwidth of the passing wavelength of the optical band pass filter to a constant wavelength. Therefore, it is not necessary to adjust the condition of the optical band pass filter; thus, it is possible to improve measurement efficiency.

Another advantage of the present invention relates to usage of the nonlinear optical element 116 such as PPLN for generating the SF light. Ordinarily, when the SF light is generated by a nonlinear optical effect in the above-mentioned nonlinear optical element 116 (PPLN), the effective bandwidth of wavelength in which nonlinear optical element 116 can invert the SF light is limited.

Ordinarily, the wavelength range in which inversion efficiency does not decrease by 3 db (region where inversion efficiency does not decrease by 3 db) when the input wavelength changes is called a wavelength range.

However, for example, when the length of the nonlinear optical element 116 is 5 mm, the wavelength range becomes nearly 5 nm.

Here, a center wavelength in the wavelength range is determined by a domain-inverted period of the nonlinear optical element 116 (PPLN). Inversion efficiency of the nonlinear optical element 116 rapidly decreases against the signal light P8 to be measured having a wavelength which is more than 2.5 nm different from the center wavelength; thus, light sampling sensitivity becomes worse.

Here, domain inversion period (ferroelectric domain inversion) is inherent to each nonlinear optical crystal; thus, the above-mentioned central wavelength is not variable.

Because of this, in the nonlinear optical crystal element 116, it is necessary to enlarge the wavelength range so as to handle various input wavelengths of the signal light P8 to be measured.

It is possible to enlarge the wavelength range by reducing the length of the PPLN crystal (in the nonlinear optical crystal element 116). For example, as shown in the reference document 2, it is possible to enlarge the wavelength range of the nonlinear optical crystal element 116 to 22.5 nm by changing the length of the PPLN crystal to 1.4 mm.

However, reducing the length of the crystal is not preferable because inversion efficiency decreases.

On the other hand, as shown in the present invention, it is possible to obtain the same effect in which the domain inversion period changes correspondingly by using the Raman shift light as sampling light pulse P4 and changing the wavelength of the sampling light pulse P4. Therefore, it is possible for the central wavelength in the wavelength range to be variable so as to be a desirable central wavelength.

By doing this, even if a PPLN crystal having a narrow wavelength range is used for a nonlinear optical crystal element, it is possible to handle various input wavelengths of the signal light P8 to be measured by adjusting the wavelength of the Raman shift light.

Also, according to the present invention, if the wavelength of the signal light to be measured and the wavelength of the sampling light pulse change, it is possible to maintain the wavelength of the SF light at a constant level. Therefore, it is not necessary to change parameters of the BPF 117 (shown in FIG. 1) according to the wavelength of the signal light P8 to be measured; thus, it is possible to extract only SF light more easily than in the conventional case by the BPF 117 which is disposed in a predetermined transmission wavelength range.

As explained above, it is possible to change the wavelength of the Raman shift light as a sampling light pulse P4 as desired by using the Raman shift light as the sampling light pulse P4, adjusting the input power (input intensity) of an input light pulse as a source of the Raman shift light, and by inputting into an optical fiber for Raman shift (a fiber 201 for Raman shift shown in FIG. 1).

As a result, in a light sampling operation for the wavelength of the signal light P8 to be measured, the optical sampling waveform measuring apparatus according to the present invention can adjust the wavelength of the Raman shift light, generate the SF light having a wavelength in a constant wavelength range, and measure the wavelength of the signal light P8 to be measured sensitively in high time resolution which is input in various wavelengths by using nonlinear optical crystal element 116 which is made of PPLN crystal or the like.

Next, a first embodiment of a detail structure of the optical sampling waveform measuring apparatus according to the present invention is explained as follows with reference to FIG. 1.

For example, for generating a signal light P8 to be measured, an electric signal generator SG1 outputs an electric signal having "10 GHz" of cycle period $f_{sig}$ as a signal light P1 to be measured.

An MLFRL 110 is excited by the input signal light P1 to be measured and generates a light pulse P6 as an light pulse row by the "10 GHz" of cycle period $f_{sig}$.

Next, a pattern generator 111 and a light intensity modulator 112 perform data modulation of the pulse light P6 to 10Gb/s of a light pulse row and outputs a light pulse P7. A optical amplifier 113 amplifies the input light pulse P7 and ejects a signal light P8 to be measured (angular frequency ω1) via a polarization direction controller 114.

Next, for generating a sampling light pulse P4 (angular frequency ω2), an electric signal generator SG2 generates an electric signal having $((f_{sig}/n)-\Delta f)$ of cycle period such as "50 MHz–100 Hz", synchronizes the electric signal with the signal light P1 to be measured which is output from the electric signal generator SG1, and outputs a sampling reference signal P2 to a light pulse source 1.

The light pulse source 1 ejects a light pulse P10 (light pulse row) having a wavelength of 1550 nm and (($f_{sig}$/n)−Δf) of the above-mentioned cycle period corresponding to the sampling reference signal. The light pulse P10 is also a stable and low timing jitter having narrow pulse width.

An optical amplifier 202 amplifies a light intensity of the light pulse P10 which is ejected from the light pulse source 1 and ejects the input light pulse P5 to an optical fiber 201 for Raman shift.

Here, the optical fiber 201 for Raman shift is a polarization maintaining fiber having a core diameter of 6 μm and the length of the optical fiber 201 is, for example, 100 m. A Raman shift light P13 occurs corresponding to the intensity of the input light pulse when the input light pulse is incident to the optical fiber 201 for Raman shift.

Also, in the optical fiber 201 for Raman shift, not only a Raman shift light P13 but also an incident component such as a light pulse P10 having a bandwidth of 1550 nm exist.

A BPF (band pass filter) 200 for removing a fundamental wave passes only the Raman shift light P13 and extracts only the Raman shift light P13 so as to eject a polarization direction controller 109.

A multiplexer 115 mixes the sampling light pulse P4 and the signal light P8 to be measured so as to eject to the nonlinear optical crystal element 116 (which is made of PPLN crystal).

Polarization direction controllers 114 and 109 set the polarization directions of the signal light P8 to be measured and the sampling light pulse P4 such that a nonlinear optical effect may occur in the nonlinear optical element 116 by performing a phase matching.

By doing this, the nonlinear optical element 116 generates the SF light by the nonlinear optical effect due to the multiplexed light pulse of the incident sampling light pulse P4 and the signal light P8 to be measured so as to perform the light sampling of the signal light P8 to be measured.

Next, the BPF 117 cuts the second harmonic beam of the sampling light pulse P4 and passes only the SF light therethrough.

A receptor 118 performs photoelectric inversion of the incident SF light. An A/D modulator 119 and a computer 120 perform waveform processing of the photoelectrically inverted SF light.

By doing this, for performing a light sampling of the signal light P8 to be measured in the optical sampling waveform measuring apparatus according to the present invention, as explained according to the above-mentioned measurement theory, it is possible to measure the wavelength of the signal light P8 to be measured which is input with various wavelength accurately, sensitively, in high time resolution in a very short time without changing the wavelength of the passing wavelength range in the BPF 117 by adjusting the wavelength of the Raman shift light so as to measure the SF light having the constant wavelength by using the nonlinear optical crystal element 116 which is made of PPLN crystal and the like.

When the light pulse P10 which occurs in the light pulse source 1 is incident on the optical fiber 201 for Raman shift, the optical amplifier 202 performs optical amplification, and a light pulse P5 is incident on the optical fiber 201 for Raman shift.

At this time, for example, if optical power (light intensity) of the above-mentioned light pulse P5 is greater than several 10s of mW, a self phase modulation occurs to the waveform of the output light pulse P5 by nonlinear optical effects such as the Kerr effect in the optical fiber 201 for Raman shift.

Thus, the light pulse becomes narrow, and a pedestal occurs in the waveform of the light pulse.

However, the Raman shift effect (Raman effect) occurs only in such a narrow light pulse, not in the pedestal.

Therefore, the waveform of the light pulse of the Raman shift light P13 becomes an optimal waveform such as sech2 light pulse of which the light pulse width is narrower than the light pulse width of the light pulse P10 which is ejected from the light pulse source 1.

When the waveform of the light pulse becomes narrow, the light pulse width of the sampling light pulse P4 becomes narrower; thus, the time resolution of light sampling of the signal light P8 to be measured improves.

As explained above according to the measurement theory, in the light sampling operation of the signal light P8 to be measured, the first embodiment of the optical sampling waveform measuring apparatus according to the present invention uses the nonlinear optical element crystal 116 which is made of PPLN crystal of the like, and adjusts the wavelength of the Raman shift light P13 so as to measure the wavelength of the SF light having a constant wavelength. Therefore, it is possible to measure the waveform of the high-speed signal light P8 to be measured which is input with various wavelengths easily without adjusting the setting of the BPF 117 accurately, and sensitively in high time resolution with very high speed. Therefore, it is sufficiently possible to measure the waveform of the signal light P8 to be measured having a pulse width on the order of terabits (region).

Also, in the first embodiment of the optical sampling waveform measuring apparatus according to the present invention, it is possible to control the light intensity of the input light pulse P5 such that the SF light should occur having a wavelength which is in a distant bandwidth of the second harmonic beam. Also, it is possible to prevent a component of the second harmonic beam from overlapping the SF light by adjusting the wavelength of the sampling light pulse P4. Therefore, it is possible to measure the waveform of the very high-speed signal light P8 to be measured which is input with various wavelengths easily, accurately, and in high time resolution at very high speed. Thus, it is possible sufficiently to measure the waveform of the signal light P8 to be measured having a pulse width on the order of terabits (region).

The embodiment of the present invention was explained as above with reference to the drawings; however, it is apparent that the invention can be embodied in a wide variety of forms, some of which may be quite different from those of the disclosed embodiments. Consequently, the specific structural and functional details disclosed herein are merely representative and do not limit the scope of the first embodiment of the present invention.

A second embodiment of the optical sampling waveform measuring apparatus according to the present invention is explained as follows with reference to FIG. 5. FIG. is a block diagram showing a structure of the optical sampling waveform measuring apparatus according the second embodiment.

Figure 5:
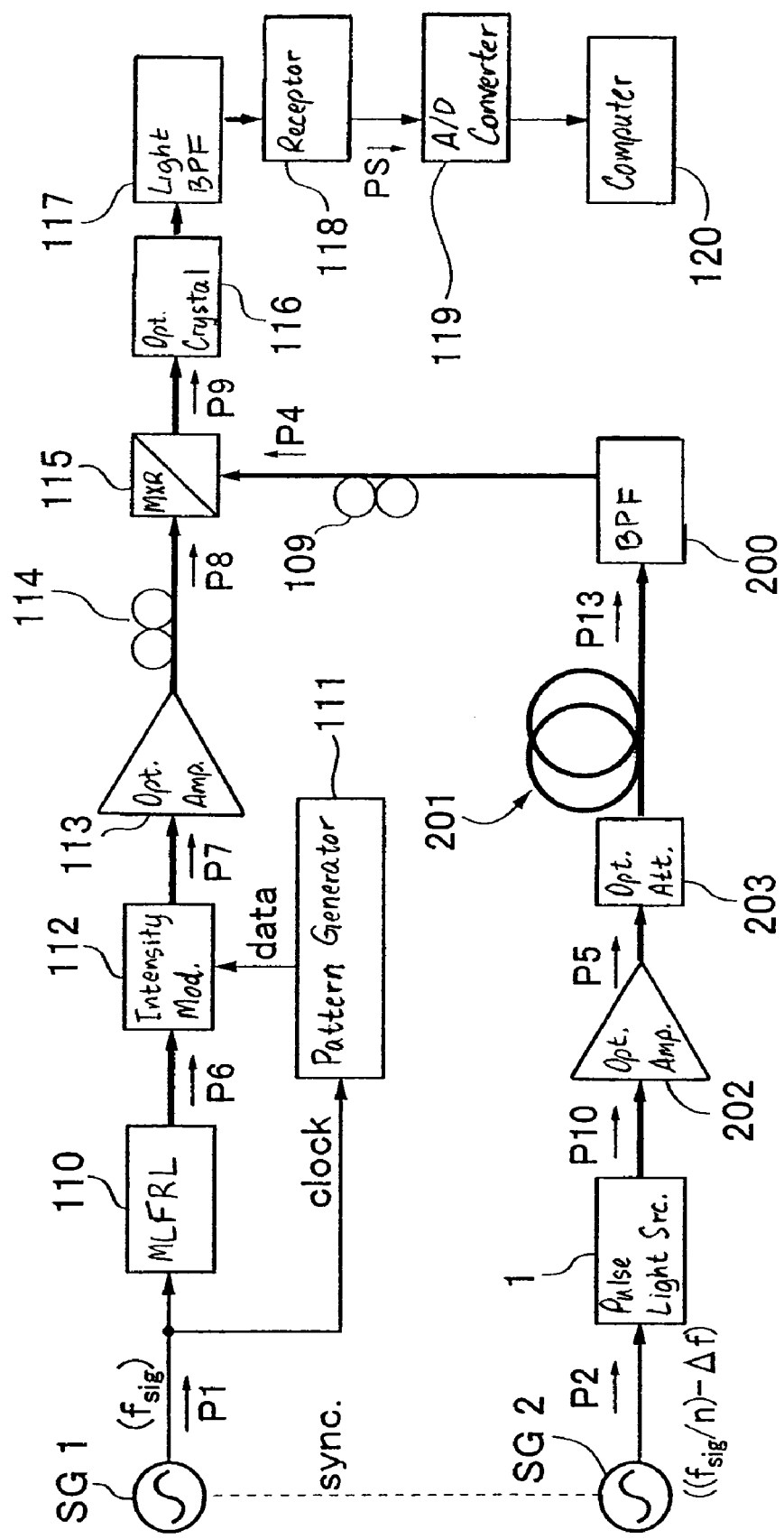
FIG. 5 is a block diagram of the second embodiment of the optical sampling waveform measuring apparatus according to the present invention.

In the second embodiment as shown in FIG. 5, the same reference numerals are applied to structures which are the same as those shown in the first embodiment so as to omit duplicated explanation.

The second embodiment of the optical sampling waveform measuring apparatus is different from that of the first embodiment in that an optical variable attenuator 203 for controlling input power which controls the input power which is input to the optical fiber 201 for Raman shift is disposed between the optical amplifier 220 and the optical fiber 201 for Raman shift.

By doing this, it is possible for the optical variable attenuator 203 for controlling input power to adjust the input power of the input light pulse P5 which is input to the optical fiber for Raman shift at a desirable optical intensity.

The optical fiber 201 for Raman shift controls the wavelength of the Raman shift light P13 as desired by changing the optical intensity of the input light pulse P5.

By doing this, in the optical sampling waveform measuring apparatus according to the present invention, the optical intensity of the input light pulse PS which is input to the optical fiber 201 for Raman shift is desirably changed by the optical variable attenuator 203 for controlling input power. The wavelength of the Raman shift light P13 such as the wavelength of the sampling light pulse P4 can be changed as desired, and the SF light having constant wavelength is output. Therefore, it is possible to measure the waveform of the input signal light P8 to be measured having various wavelengths by the BPF 117 which is disposed in a constant wavelength range easily without changing the wavelength range which passes through the BPF 117.

Also, the second embodiment of the optical sampling waveform measuring apparatus has the same effect as that of the first embodiment of the optical sampling waveform measuring apparatus.

Figure 6:
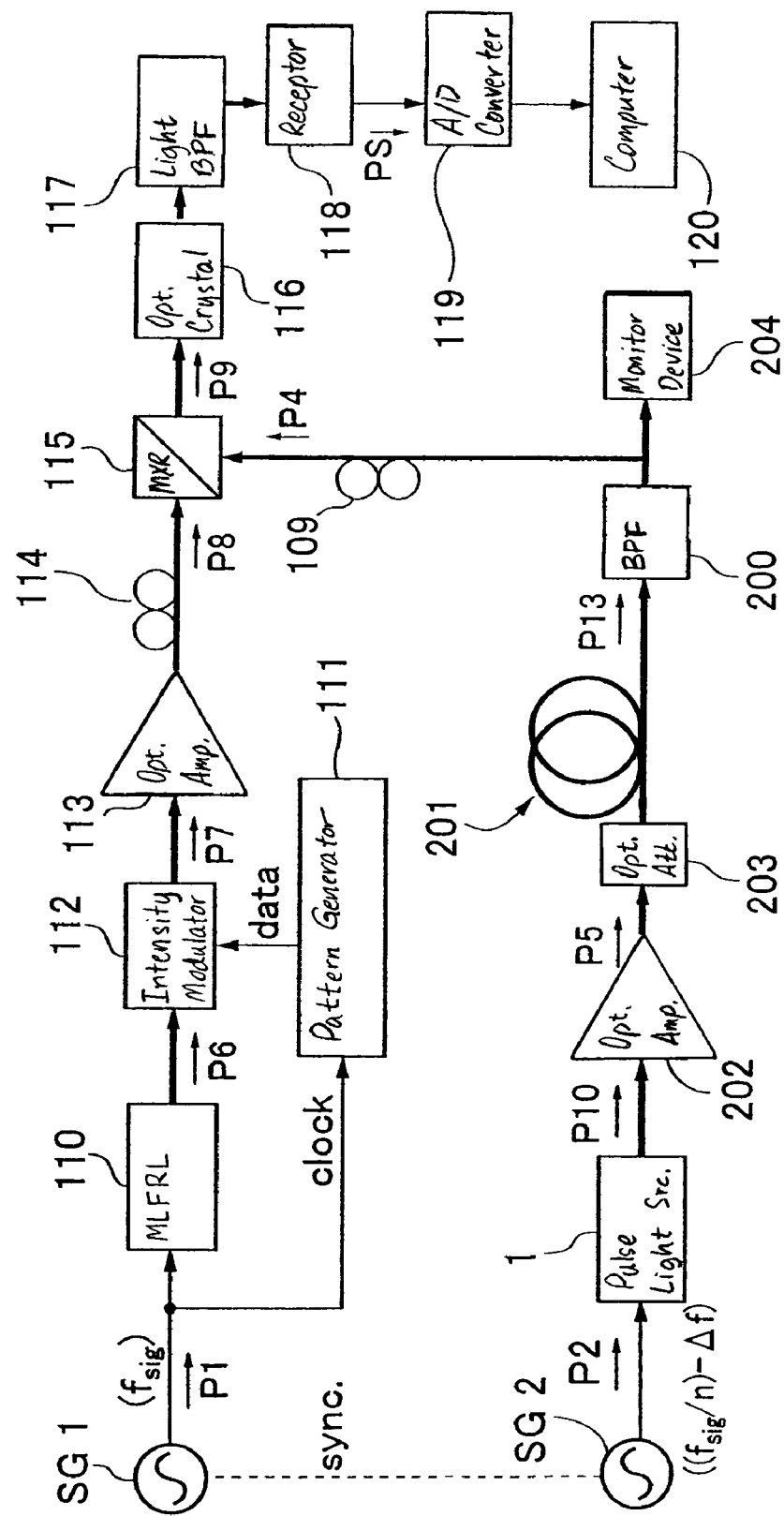
FIG. 6 is a block diagram of the third embodiment of the optical sampling waveform measuring apparatus according to the present invention.

The third embodiment of the optical sampling waveform measuring apparatus according to the present invention is explained as follows with reference to FIG. 6. FIG. 6 is a block diagram showing a structure of the third embodiment of the optical sampling waveform measuring apparatus. In the third embodiment as that shown in FIG. 6, the same reference numerals are put to the structure which is the same as shown in the first embodiment in FIG. 1 so as to omit duplicated explanation.

The third embodiment of the optical sampling waveform measuring apparatus is different from that of the second embodiment in that an optical wavelength monitoring device 204 for monitoring the wavelength of the Raman shift light P13 which is generated by the optical fiber 201 for Raman shift is disposed.

By doing this, the optical wavelength monitoring device 204 measures the wavelength of the Raman shift light P13 which is generated by the optical fiber 201 for Raman shift by using the wavelength corresponding to the optical intensity of the input light pulse P5 which is incident. It is possible to accurately control the wavelength of the Raman shift light P13 as desired by a feedback of the measurement result to the optical variable attenuator 203 for controlling input power.

The optical sampling waveform measuring apparatus according to the present invention controls the optical variable attenuator 203 for controlling input power based on the measurement result by the above-mentioned optical wavelength monitoring device 204. Furthermore, the optical intensity of the light pulse P5 which is incident on the optical fiber 201 for Raman shift is adjusted so that the sampling light pulse P4 having a necessary wavelength can be obtained; thus, the Raman shift light P13 is generated by the optical fiber 201 for Raman shift. Therefore, it is possible to generate the sampling light pulse P4 precisely which is necessary in the measuring operation; thus, it is possible to measure the optical waveform of the signal light P8 to be measured in a wave range thereof accurately.

Also, the third embodiment of the optical sampling waveform measuring apparatus has the same effect as that of the first and the second embodiments of the optical sampling waveform measuring apparatus.

What is claimed is:

1. An optical sampling waveform measuring apparatus, comprising:
 a signal generator section for outputting pulses-to-be-measured;
 a sample pulse generator section for outputting electric sampling pulses; and
 an evaluation section for evaluating properties of pulses consisting of the pulses-to-be-measured and the sampling pulses;
 wherein the sample pulse generator section further includes:
  a pulse light source for emitting optical sampling pulses having a cycle frequency ($f_{sig}/n$) of corresponding to the frequency of the electric sampling pulses;
  an optical amplifier for amplifying the optical sampling pulses and emitting amplified pulses;
  a Raman-shift fiber for generating a Raman-shift beam in accordance with intensity of the emitted amplified pulses;
  a band-pass filter for separating the optical sampling pulses from said Raman-shift beam and emitting only the Raman-shift beam; and
  a polarization direction controller for controlling a polarization direction of the separated Raman-shift beam, and outputting polarization-controlled optical sampling pulses having a cycle frequency $f_{sig}$; and
 wherein the evaluation section applies a sum frequency light generation effect in which a first kind of phase matching condition is used as a nonlinear optical effect.

2. An optical sampling waveform measuring apparatus according to claim 1 wherein the evaluation section applies a difference frequency light generation effect in which the first kind of phase matching condition is used as a nonlinear optical effect.

3. An optical sampling waveform measuring apparatus according claims 1 to 2 wherein a nonlinear optical crystal having a periodically domain-inverted structure is used as a nonlinear optical element for realizing the nonlinear optical effect.

4. An optical sampling waveform measuring apparatus according to claim 3 wherein a variable optical attenuator is provided for adjusting a wavelength of the generated Raman shift light.

5. An optical sampling waveform measuring apparatus according to claim 3 wherein a monitoring device for Raman shift light wavelength performs control by monitoring a wavelength of the Raman shift light.

* * * * *